US012119599B2

(12) United States Patent
Huang et al.

(10) Patent No.: US 12,119,599 B2
(45) Date of Patent: Oct. 15, 2024

(54) MODIFIED SOCKET

(71) Applicant: Elevon Industrial Design Co., Ltd., Changhua (TW)

(72) Inventors: Wei Shiang Huang, Changhua (TW); Fang Chi Tsai, Changhua (TW)

(73) Assignee: ELEVON INDUSTRIAL DESIGN CO., LTD., Changhua (TW)

( * ) Notice: Subject to any disclaimer, the term of this patent is extended or adjusted under 35 U.S.C. 154(b) by 364 days.

(21) Appl. No.: 17/748,892

(22) Filed: May 19, 2022

(65) Prior Publication Data

US 2023/0378703 A1 Nov. 23, 2023

(51) Int. Cl.
*H01R 35/04* (2006.01)
*H01R 13/629* (2006.01)

(52) U.S. Cl.
CPC ........... *H01R 35/04* (2013.01); *H01R 13/629* (2013.01)

(58) Field of Classification Search
CPC .. H01R 35/04; H01R 13/629; H01R 13/4532; H01R 13/193; H01R 13/20
USPC ................................ 439/138, 143, 268, 266
See application file for complete search history.

(56) References Cited

U.S. PATENT DOCUMENTS 2,532,219 A * 11/1950 Bierce .................. H01R 13/447 174/67
3,225,323 A * 12/1965 Deakin .............. H01R 33/7628 439/656
4,584,430 A * 4/1986 Belknap ............. H01R 13/4532 174/67
5,066,238 A * 11/1991 Shieh ................. H01R 13/4532 439/139
5,865,633 A * 2/1999 Hou ................... H01R 13/4532 439/143
6,364,673 B1 * 4/2002 Lee .................... H01R 13/4532 174/67
7,841,877 B1 * 11/2010 Lai ..................... H01R 13/4532 439/145
9,583,863 B1 * 2/2017 Rittinghaus ........ H01R 13/4532
2020/0059055 A1 * 2/2020 Huang ..................... H01R 4/52

* cited by examiner

*Primary Examiner* — Gary F Paumen

(74) *Attorney, Agent, or Firm* — Muncy, Geissler, Olds & Lowe, P.C.

(57) ABSTRACT

A modified socket for a plug having two pins to plug therein includes a casing, a rotatable cap, two pairs of electrical clips and a resilient means. The rotatable cap is rotatable between an inserting position and a power-on position. Each pair of electrical clips is disposed in the casing and has a fixed jaw and a movable jaw. The movable jaw is movable between a home position and an accumulating position. The resilient means is adapted for accumulating resilient force when the movable jaws are moved toward the accumulating positions and for releasing the resilient force to move the movable jaws to the home positions. During the rotation of the rotatable cap from the inserting position to the power-on position, the resilient means will accumulate the resilient force and then release it. The movable jaws will then contact and electrically connect to the pins.

7 Claims, 6 Drawing Sheets

MODIFIED SOCKET

BACKGROUND OF THE INVENTION

Field of the Invention

The present invention relates generally to a socket, and more particularly to a socket convenient for users to insert and remove plugs.

Description of the Prior Art

Conventional sockets are provided with conductive clips. When the user inserts a plug into the socket, pins of the plug will be clamped by the conductive clips. On the one hand, the plug and the socket can be electrically connected. On the other hand, the conductive clips give the pins clamping force to prevent the plug from leaving the socket under slight external force. As a result, when unplugging the plug (especially for non-fixed extension cord sockets), the user usually needs to hold the socket with one hand, and then remove the plug with the other hand. In other words, the user usually cannot pull out the plug with only one hand without other means to hold the socket.

SUMMARY OF THE INVENTION

In view of the foregoing, one object of the present invention is to provide a modified socket convenient for users to insert and remove plugs.

To achieve the above and other objects, the present invention provides a modified socket for a plug having two pins to plug therein. The modified socket includes a casing, a rotatable cap, two pairs of electrical clips and a resilient means. The rotatable cap is rotatably disposed on the casing in a manner that the rotatable cap is rotatable between an inserting position and a power-on position. The rotatable cap sequentially includes a first travel and a second travel on a path rotating from the inserting position to the power-on position. The rotatable cap has a cap body and a pair of plug holes penetrating the cap body for the pins to insert therethrough, respectively. Each of the two pairs of electrical clips is disposed in the casing and has a fixed jaw and a movable jaw electrically connected to the fixed jaw. Each of the movable jaws is movable between a home position and an accumulating position. The two pairs of electrical clips are corresponding to the plug holes, respectively. The resilient means is adapted for accumulating resilient force when the movable jaws are moved toward their corresponding accumulating positions, respectively, and for releasing the resilient force to move the movable jaws back to their corresponding home positions, respectively. When viewed from a direction facing the rotatable cap while the rotatable cap is located at the inserting position, the plug holes are not overlapped with contours of the two pairs of the electrical clips, respectively, in a manner that the two pairs of electrical clips are unable to electrically connect to the pins inserted in the plug holes, respectively. When the rotatable cap is rotated toward the power-on position and within the first travel, the rotatable cap is adapted to push the two movable jaws toward their corresponding accumulating positions, respectively, and make the resilient means to accumulate the resilient force. When the rotatable cap enters the second travel right from the first travel, the resilient means starts to release the resilient force to push the movable jaws back to their corresponding home positions, respectively, and further drive the rotatable cap to rotate to the power-on position. When the rotatable cap is located at the power-on position, the two pairs of electrical clips are adapted to contact and electrically connect to the two pins, respectively.

In view of the foregoing, some embodiments of the present invention can achieve the following effects:

(1) the plug can be removed from the socket with only one hand;

(2) the plug can only be power-on when the rotatable cap is located at the power-on position, and the plug is powered off when the rotatable cap is located at the inserting position; that is to say, the rotatable cap itself can function as a switch;

(3) the components used to provide fixing force to the pins can all be made of conductive metal components and are not east to melt; the details thereof are explained hereinafter.

DETAILED DESCRIPTION OF THE PREFERRED EMBODIMENTS

Figure 1:
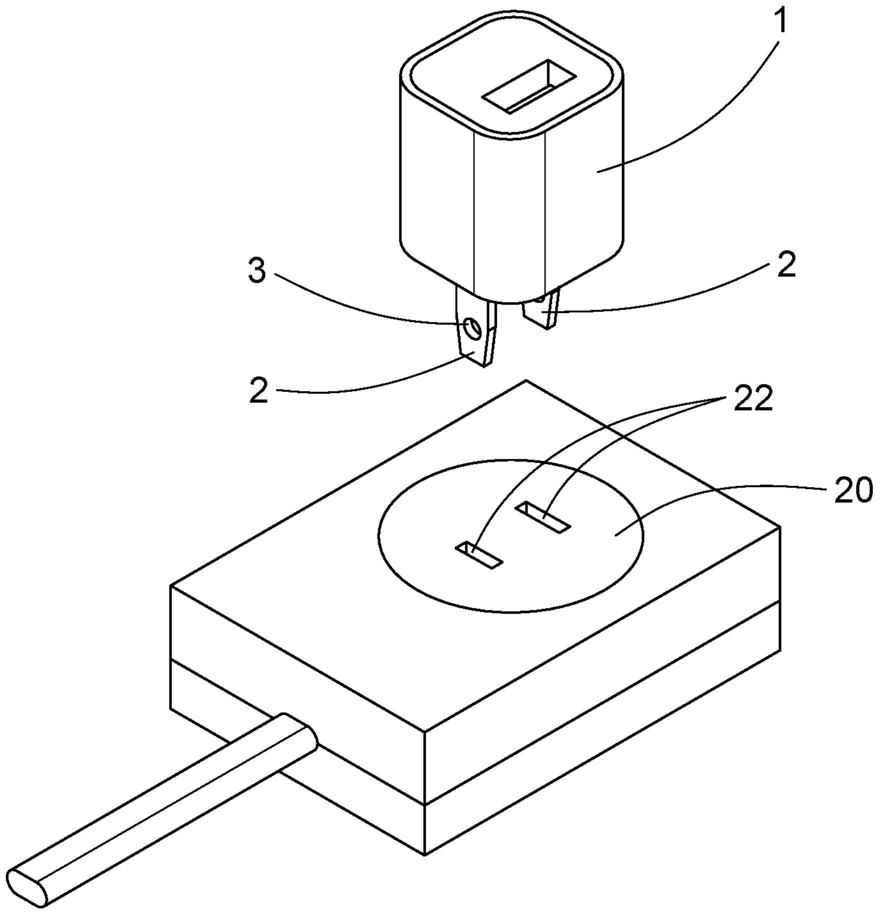
FIG. 1 shows a modified socket in accordance with an embodiment of the present invention, which is used to cooperate with a plug.
Figure 2:
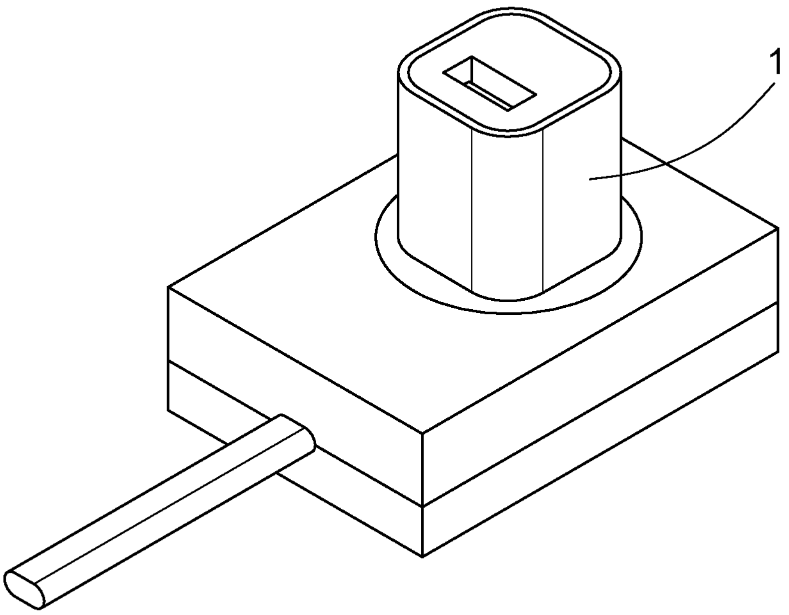
FIG. 2 shows the modified socket in accordance with the embodiment of the present invention, in which the plug is plugged therein.

Please refer to FIGS. 1 and 2 for a modified socket in accordance with an embodiment of the present invention, which is cooperated with a plug 1. The plug 1 has two parallel pins 2 arranged side by side. Each of the pins 2 is formed with a positioning hole 3. These two pins 2 respectively represent the neutral and live wires of the power supply. In possible embodiments, the widths of the two pins are different, in which the wider one is the neutral wire and the narrower one is the live wire. In possible embodiments, the plug may have a third wire used as the earth wire of the power supply. In the present embodiment, the two pins 2 are long and flat. In other possible embodiments, the pins can be made with other shapes. The modified socket of the present invention can be applied to a non-fixed extension cord socket or a fixed socket, and said socket may include one or more modified sockets of the present invention.

Figure 3:
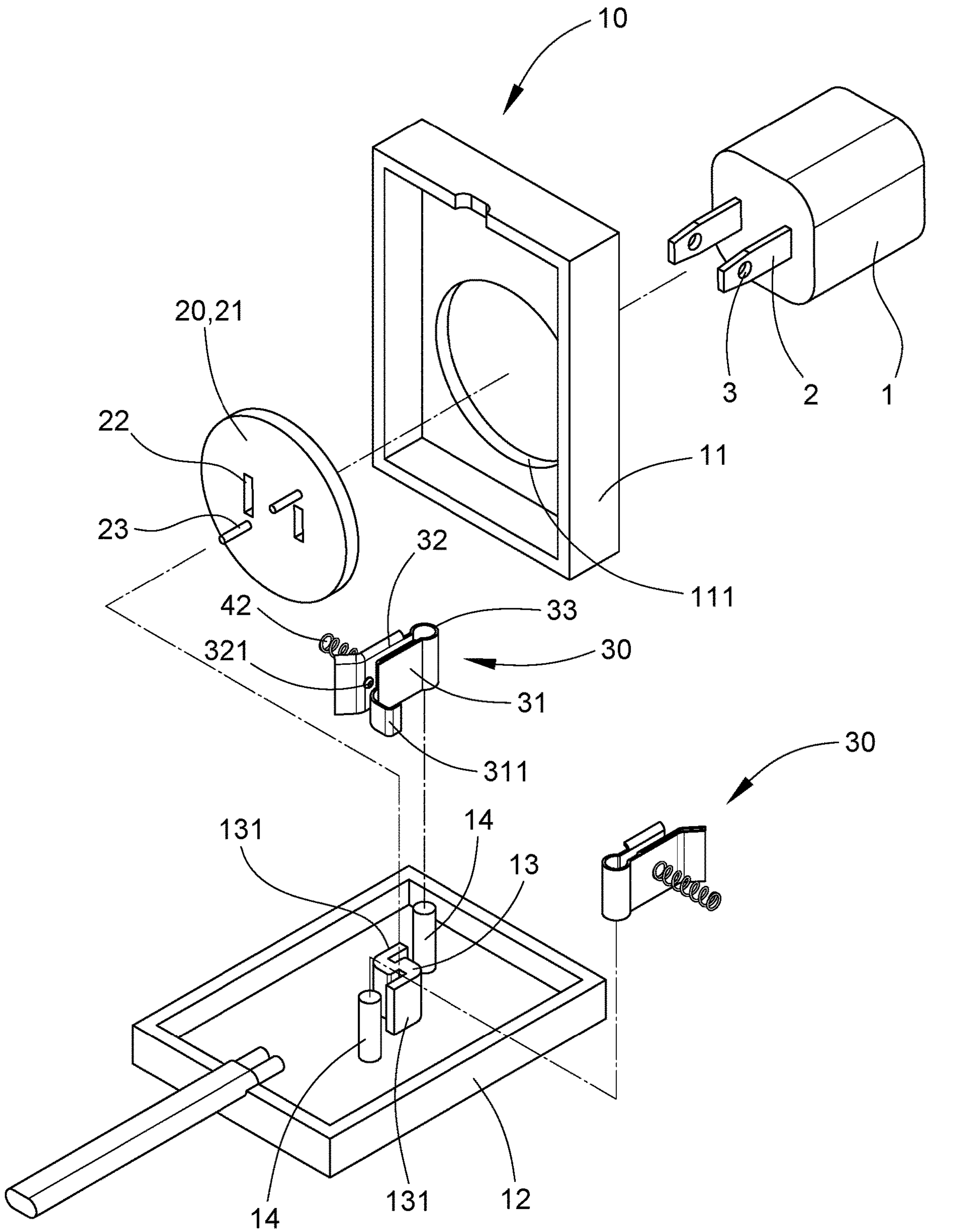
FIG. 3 shows an explosive drawing of the modified socket in accordance with the embodiment of the present invention.

Please further refer to FIG. 3. In the present embodiment, the modified socket has a casing 10, a rotatable cap 20, two pairs of electrical clips 30 and a resilient means.

The casing 10 has an upper shell 11, a lower shell 12, a wall 13 and two positioning pins 14. The upper and lower shells 11, 12 can be butted and tightly connected. The upper shell 11 is formed with an opening 111. The wall 13 and the positioning pins 14 are formed on the lower shell 12. The wall 13 extends substantially in "S" shape and has two abutting surfaces 131. The positioning pins 14 are located adjacent to two opposite ends of the S-shaped wall 13, respectively.

Figure 4:
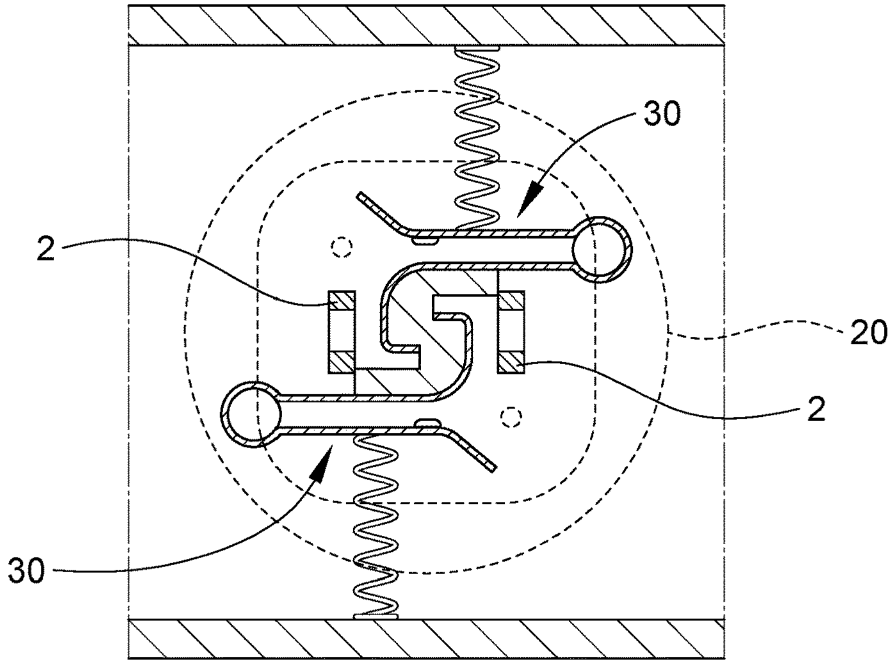
FIGS. 4-8 show profiles of the modified socket in accordance with the embodiment of the present invention while the rotatable cap is rotated from an inserting position to a power-on position.
Figure 8:
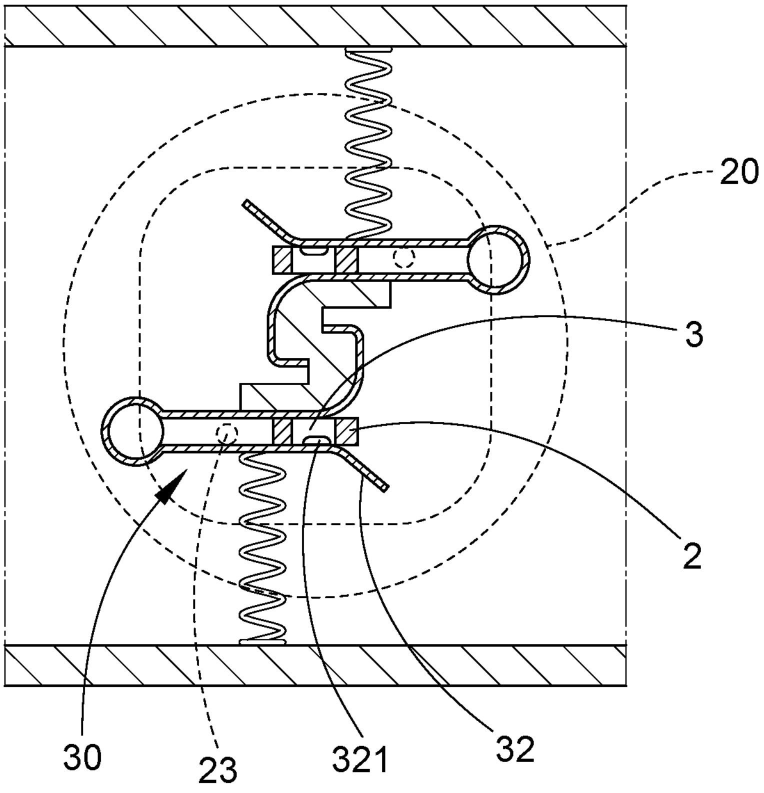

The rotatable cap 20 is made of insulating material and is rotatably disposed on the casing 10. More specifically, the rotatable cap 20 is rotatably engaged with the opening 111 of the upper shell 11 in a manner that it can be rotatable between an inserting position (as shown in FIGS. 2 and 4) and a power-on position (as shown in FIG. 8). The rotatable cap 20 sequentially includes a first travel and a second travel on a path rotating from the inserting position to the power-on position, and, in possible embodiments, may further include a preparatory travel prior to the first travel. The definition of these travels will be explained when the working principle is revealed hereinafter. The rotatable cap 20 has a cap body 21, a pair of parallel plug holes 22 arranged side by side, and a pair of shafts 23. The plug holes 22 penetrates the cap body 21 for the pins 2 to insert therein. The shafts 23 is formed on a bottom surface of the cap body 21.

Figure 7:
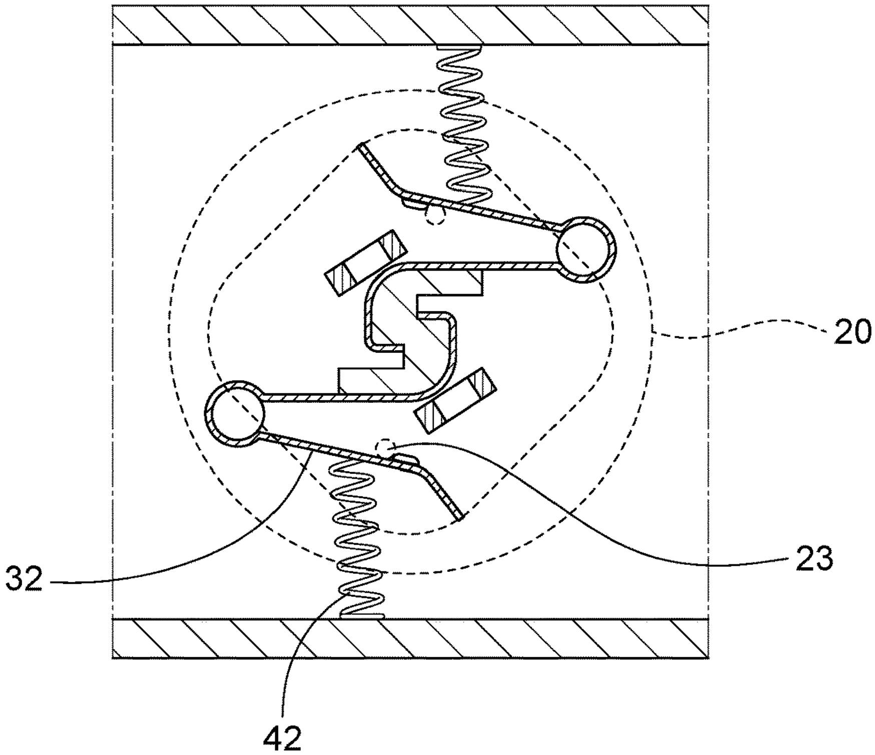

The two pairs of electrical clips 30 are corresponded to the plug holes 22. Each electrical clip 30 has a fixed jaw 31, a movable jaw 32 and a substantially C-shaped connecting rim 33 connecting the fixed jaw 31 with the movable jaw 32 so that the fixed jaw 31 and the movable jaw 32 are electrically connected to each other. The two pairs of electrical clips 30 are disposed in the casing 10. More specifically, the connecting rims 33 are sleeved on the shafts 23, respective. The fixed jaws 31 abuts against the abutting surfaces 131, respectively, and each of the fixed jaws 31 is formed with a fixed portion 311 at its end which may hook the wall 13, such that the fixed jaws 31 may remain stationary while the movable jaws 32 are moved. On the other hand, each of the movable jaws 32 has a bump 321 and is movable between a home position (as shown in FIG. 4) and an accumulating position (as shown in FIG. 7). The two shafts 23 are corresponding to the two movable jaws 32, respectively, and are adapted to transmit force while the movable jaws 32 are movable.

The resilient means is adapted for accumulating resilient force when the movable jaws 32 are moved toward their corresponding accumulating positions, respectively, and for releasing the resilient force to move the movable jaws 32 back to their home positions, respectively. In the present embodiment, the resilient means includes a pair of reeds and a pair of springs 42. Furthermore, in the present embodiment, the reeds constitute a part of the movable jaws 32, respectively. More specifically, the movable jaws 32 made of copper may have the characteristics of reeds, i.e., the movable jaws 32, function as the reeds, each has a fixed end connecting to the connecting rim 33 and a movable distal end away from the connecting rim 33. On the other hand, each of the springs 42 abuts against the casing 10 at an end thereof and abuts against one of the movable jaws 32 with the other end thereof so as to achieve the objectives of accumulating and releasing the resilient force. In the present embodiment, the reeds and the springs 42 are all made of relatively high-temperature resistant materials, which can meet safety regulations. In other possible embodiments, the reeds and the springs may alternatively exist. For instance, the movable jaws do not function as reeds, and the resilient force is solely supplied by the springs. Alternatively, the movable jaws function as reeds without the assistance of springs. In other possible embodiments, the resilient means may be reeds, springs in other forms, other elastic units or the combination thereof.

The working principle of the modified socket of the present embodiment is described hereinafter in conjunction with the drawings.

Please refer to FIG. 4. The rotatable cap 20 is located at the inserting position, while the pins 2 is inserted in the plug holes, respectively. When viewed from the direction facing the rotatable cap 20, i.e., the direction parallel to the rotating axis of the rotatable cap 20 as shown in FIG. 4, the plug holes (substantially equivalent to the outer peripheries of the pins 20) are not overlapped with the contours of the electrical clips 30 such that the two electrical clips 30 cannot electrically connected to the pins 2.

Figure 5:
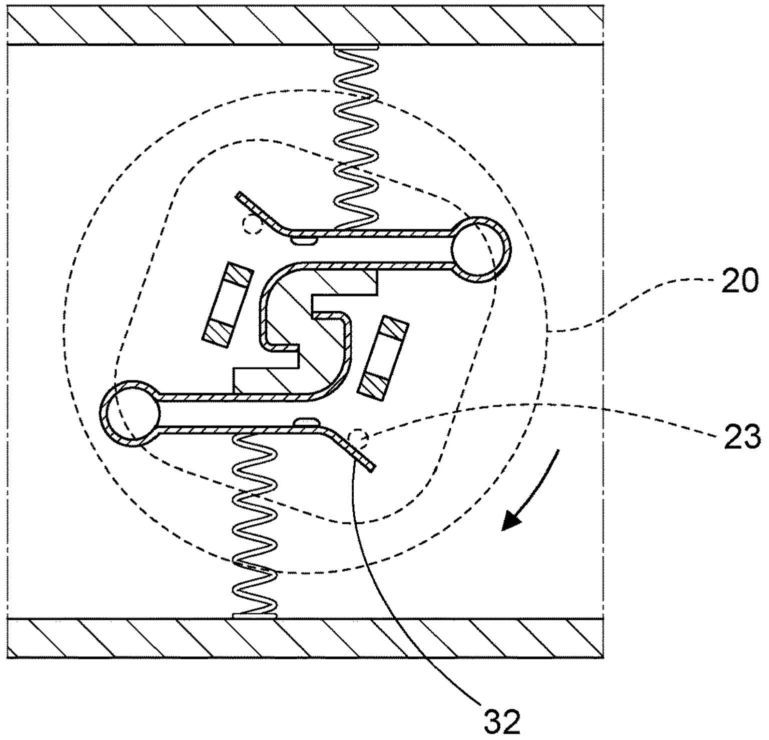

Please refer to FIG. 5. When the user rotates the rotatable cap 20 toward the power-on position, the rotatable cap 20 passes through the preparatory travel until the shafts 23 contact the movable jaws 32 located at their home positions, respectively. That is to say, the preparatory travel refers to the travel of the rotatable cap 20 from the position shown in FIG. 4 to the position shown in FIG. 5.

Figure 6:
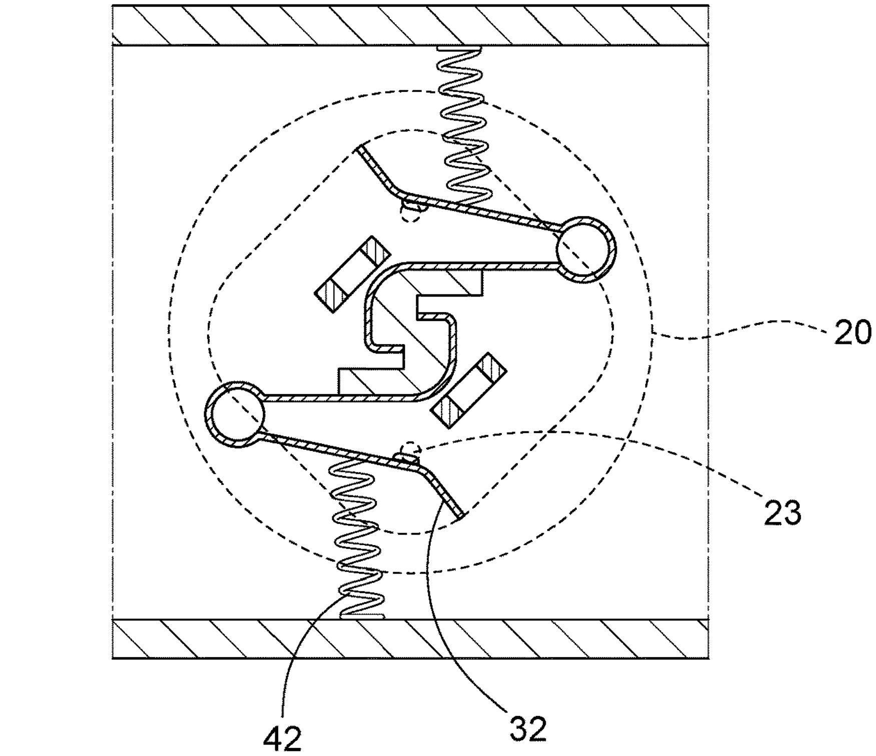

The first travel refers to travel of the rotatable cap 20 from the position shown in FIG. 5 to the position shown in FIG. 7 via the position shown in FIG. 6. In the first travel, the shafts 23 constantly contact the movable jaws 32. At this time, the user needs to push away the resilient means, namely the reeds and the springs 42, so that the resilient means can accumulate resilient force until the rotatable cap 20 arrives at the position shown in FIG. 7. At this position, the resilient force is accumulated to the maximum, and the movable jaws 32 are at their accumulating positions, respectively.

After the rotatable cap 20 reaches the end of the first travel (the position shown in FIG. 7), the path further rotating toward the power-on position as shown in FIG. 8 belongs to the second travel. At this time, even if the user does not exert any force, the resilient means will still release the resilient force and push the two movable jaws 32 toward their corresponding home positions, respectively. The two movable jaws 32 further push the shafts 23, respectively, to drive the rotatable cap 20 to rotate toward toward the power-on position, as shown in FIG. 8, via the second travel. When the rotatable cap 20 arrives at the power-on position, the bumps 321 of the movable jaws 32 are embedded in the positioning holes 3 of the pins 2, respectively, and the two electrical clips 30 clamp and electrically connect to both sides of their corresponding pins 2. At this time, the plug is powered on. Because the bumps 321 are embedded in the pins 2, the plug will not be easily loosened from the socket by accident touches.

When the user wants to pull out the plug, he/she only needs to reversely rotate the rotatable cap 20 from the position shown in FIG. 8 to the position shown in FIG. 4, and then the user can pull out the plug 1 which is not clamped or interfered by the electrical clips 30 with only one hand.

In light of the foregoing, it can be understood that the effects which the present embodiment can achieve include: 1) the plug can be removed from the socket with only one hand; (2) the plug can only be power-on when the rotatable cap is located at the power-on position, and the plug is powered off when the rotatable cap is located at the inserting position; that is to say, the rotatable cap itself can function as a switch; (3) the components used to provide fixing force to the pins can all be made of conductive metal components and are not east to melt.

It is to be noted that, in the above-mentioned embodiment, the path for the rotatable cap to rotate from the inserting position toward the power-on position includes a preparatory travel. However, in other possible embodiments, the preparatory travel can be omitted. In this case, when the rotatable cap is at the inserting position, the shafts or other parts which rotate in conjunction with the rotatable cap (other than the pins) are in contact with the movable jaws. Therefore, there is no preparatory travel.

In addition, in the embodiment where the plug has a third pin used as the earth wire, an earth terminal is also provided in the casing. When the rotatable cap is rotated to the power-on position, the third pin used as the earth wire can contact the earth terminal to form an electrical connection.

What is claimed is:

1. A modified socket for a plug having two pins to plug therein, comprising a casing;

a rotatable cap, rotatably disposed on the casing in a manner that the rotatable cap is rotatable between an inserting position and a power-on position, the rotatable cap sequentially comprising a first travel and a second travel on a path rotating from the inserting position to the power-on position, the rotatable cap having a cap body and a pair of plug holes penetrating the cap body for the pins to insert therethrough, respectively;

two pairs of electrical clips, each disposed in the casing and having a fixed jaw and a movable jaw electrically connected to the fixed jaw, each of the movable jaws being movable between a home position and an accumulating position, the two pairs of electrical clips being corresponding to the plug holes, respectively; and a resilient means for accumulating resilient force when the movable jaws are moved toward their corresponding accumulating positions, respectively, and for releasing the resilient force to move the movable jaws back to their corresponding home positions, respectively;

wherein, when viewed from a direction facing the rotatable cap while the rotatable cap is located at the inserting position, the plug holes are not overlapped with contours of the two pairs of the electrical clips, respectively, in a manner that the two pairs of electrical clips are unable to electrically connect to the pins inserted in the plug holes, respectively;

wherein, when the rotatable cap is rotated toward the power-on position and within the first travel, the rotatable cap is adapted to push the two movable jaws toward their corresponding accumulating positions, respectively, and make the resilient means to accumulate the resilient force;

wherein, when the rotatable cap enters the second travel right from the first travel, the resilient means starts to release the resilient force to push the movable jaws back to their corresponding home positions, respectively, and further drive the rotatable cap to rotate to the power-on position;

wherein, when the rotatable cap is located at the power-on position, the two pairs of electrical clips are adapted to contact and electrically connect to the two pins, respective.

2. The modified socket of claim 1, wherein the rotatable cap further has a pair of shafts disposed on a bottom surface of the cap body, the shafts are corresponding to the movable jaws, respectively; wherein, when the rotatable cap is rotated toward the power-on position and within the first travel, the shafts pushes their corresponding movable jaws toward their corresponding accumulating positions, respectively; wherein, when the resilient means starts to release the resilient force to push the movable jaws back to their corresponding home positions, respectively, the movable jaws push the shafts, respectively, to drive the rotatable cap to rotate toward the power-on position via the second travel.

3. The modified socket of claim 1, wherein the resilient means comprises a pair of reeds, each having a fixed end and a movable distal end.

4. The modified socket of claim 1, wherein the casing further comprises a wall, the wall has two abutting surfaces for the fixed jaws to abut thereagainst, respectively.

5. The modified socket of claim 1, wherein the resilient means comprises a pair of springs, each abuts against the casing with an end thereof and abuts against one of the movable jaws with the other end thereof.

6. The modified socket of claim 1, wherein when viewed from the direction facing the rotatable cap while the rotatable cap is within the first travel, the plug holes are not overlapped with the contours of the two pairs of the electrical clips, respectively.

7. The modified socket of claim 1, wherein the pins are long and flat, each of the pins is formed with a positioning hole, the movable jaws each has a bump corresponding to one of the positioning holes, when the rotatable cap is located at the power-on position, the bumps of the movable jaws are embedded in the positioning holes of the pins inserted in the plug holes, respectively.

* * * * *